United States Patent
Ebisch, Jr.

(10) Patent No.: US 6,867,784 B2
(45) Date of Patent: Mar. 15, 2005

(54) METHODS, SYSTEMS, AND COMPUTER READABLE MEDIA FOR USING CLOSED CONTOURS OF A MODELED SURFACE

(75) Inventor: Konrad Ernst August Ebisch, Jr., Buda, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 10/426,996

(22) Filed: Apr. 30, 2003

(65) Prior Publication Data

US 2004/0217968 A1 Nov. 4, 2004

(51) Int. Cl.[7] .............................................. G09G 5/00
(52) U.S. Cl. ...................... 345/581; 345/441; 345/442; 345/649; 345/660; 345/672; 345/673; 345/589
(58) Field of Search ................................. 345/581, 441, 345/442, 649, 660, 672, 673, 589

(56) References Cited

U.S. PATENT DOCUMENTS

| | | | | |
|---|---|---|---|---|
| 4,497,755 A | * | 2/1985 | Korsyn ........................ 264/1.7 |
| 5,765,828 A | * | 6/1998 | Baker et al. ............. 273/108.2 |
| 6,448,969 B1 | * | 9/2002 | Minakawa et al. ......... 345/428 |
| 2001/0028350 A1 | * | 10/2001 | Matsuoka et al. .......... 345/427 |
| 2002/0181752 A1 | * | 12/2002 | Wallo et al. ................ 382/130 |

* cited by examiner

*Primary Examiner*—Matthew C. Bella
*Assistant Examiner*—Mike Rahmjoo
(74) *Attorney, Agent, or Firm*—Merchant & Gould

(57) ABSTRACT

Methods, systems, and computer readable media use closed contours of a modeled surface for various purposes such as displaying a contour map of the modeled surface or computing volumetrics. For the closed contours, a colorfilled contour map may be displayed where each contour level is represented as a shape that has an opaque fill color by calculating the area of each shape and displaying the shapes in decreasing order of area. Where both elevations and depressions are present, such that elevations have a positive area and depressions have a negative area, the shapes are displayed in decreasing order of the absolute value of area. Where null values in the modeled surface are present such that unclosed contours result, values are substituted into the null values to close the contours. These closed contours may then be used for various purposes, such as calculating volumetrics of the modeled surface or generating the colorfilled contour map display according to the area of the closed contours.

25 Claims, 7 Drawing Sheets

METHODS, SYSTEMS, AND COMPUTER READABLE MEDIA FOR USING CLOSED CONTOURS OF A MODELED SURFACE

TECHNICAL FIELD

The present invention is related to contours for surfaces that have been modeled to produce three-dimensional data for the surfaces. More particularly, the present invention is related to the use of closed contours of the modeled surface, such as to render a display of a contour map or compute volumetrics.

BACKGROUND

Surfaces such as the exterior of the earth are modeled by producing three-dimensional data for the surface, which includes a z-axis value falling within a particular contour level for each x, y coordinate of the surface in a Cartesian plane. The coordinates of the surface that have a common z-axis value form a contour level that may be defined by a polygon or other shape. The contour levels defined by the shapes may be used to produce contour maps or for other purposes such as volumetric calculations. Such contours, contour maps, and related calculations are often useful in the petroleum industry where knowledge of the earth's surface and local volume is necessary to efficiently find and extract oil reserves.

The z-axis data that define the contour levels for the surface being modeled may be generated in various ways, but inevitably, there are z-axis values that are null such that the contour level for a given x, y coordinate or set of x, y coordinates is undefined. For example, z-axis data may stop along an edge of the area being modeled even though the contour level at the edge might otherwise continue had a larger area been included in the modeling. Additionally, z-axis data within the modeled space may be null as well such as due to imperfect data gathering.

The null values for the z-axis present in a surface model result in difficulty. The null values result in a contour being left open because the polygon or other shape resulting from tracing the bounds of the contour cannot return to its starting point due to a break in the continuity of the z-axis data. When the contour is left open, the ability to compute values such as the area of a contour or the volume of the surface being modeled is complicated. Furthermore, rendering a display of a colorfilled contour map is also complicated by open contours. For example, one previous solution required that the contours be dissected by grid cell of the surface model, that a polygonal net be built on each cell, and then the colorfill polygons be extracted from the net and displayed.

The display of a colorfilled contour map is also complicated, even for closed contours, by the use of opaque colors for the various contour levels. When contours are being displayed as a colorfilled contour map, the display of one polygon or other shape representing one contour level will overlap with the display of another polygon or other shape representing a different contour level. Thus, the portions of contours that are obscured by overlapping contours but that should not be obscured in the display must be corrected to result in an accurate contour map display.

SUMMARY

Embodiments of the present invention address these issues and others by providing for use of closed contours. In certain embodiments, treatment of null values is provided to result in closed contours and thereby aid the additional uses of the contours. Furthermore, for closed contours, certain embodiments provide for the display of opaque contour levels that do not inaccurately obscure other contour levels.

One embodiment displays a colorfilled contour map for a modeled surface. Shapes that are closed contours are generated for various contour levels to be represented. The area of each of the shapes is calculated, and the shapes are displayed using substantially opaque color for each shape. The shapes are added to the display in order of decreasing area.

Another embodiment uses closed contours for a modeled surface. Null values are detected within the modeled surface that leave contours of the modeled surface open. A value is assigned in place of the null values', and an absolute value of the value being assigned is multiple orders of magnitude larger than the absolute value of maximum non-null values of the modeled surface. The assigned values are used to close the contours where the null values result in open contours.

Another embodiment uses closed contours to display a colorfilled contour map for a modeled surface. Null values are detected within contours of the modeled surface that leave the contours open. A value is assigned in place of the null values, wherein an absolute value of the value being assigned is multiple orders of magnitude larger than the absolute value of maximum non-null values of the modeled surface. The assigned values are used to close the contours where the null values result in open contours, and the closed contours are represented as shapes. The area of each of the shapes is calculated, and the shapes are displayed using substantially opaque color for each shape, wherein the shapes are added to the display in order of decreasing area.

DETAILED DESCRIPTION

Embodiments of the present invention generate and/or use closed contours for various purposes including generating contour maps and calculating volumetrics for a surface model. Null values of the surface model may be treated so that contours left open by the null values are closed. The closed contours allow volumetrics to be computed for the surface model as well as the area of each closed contour. Calculating the area of each closed contour allows the contours to be ordered according to the area so that each contour may be added to a display in an order that prevents contours from being obscured due to overlaps with other contours.

These embodiments of the present invention are implemented as logical processing operations that are performed on the surface model data, which include the z-axis value for each x, y coordinate of the surface model where the z-axis value identifies the contour interval that a particular x, y coordinate falls within. The processing of the surface model data may result from the execution of program modules on a conventional computer system, described below with reference to FIG. 1, or from the execution of hard-wired special purpose digital logic or other processing devices and systems. Accordingly, while the discussion below relates to the use of program modules on a conventional computer system such as shown in FIG. 1, it will be appreciated that this discussion is for purposes of example and is not intended to be limiting.

Figure 1:
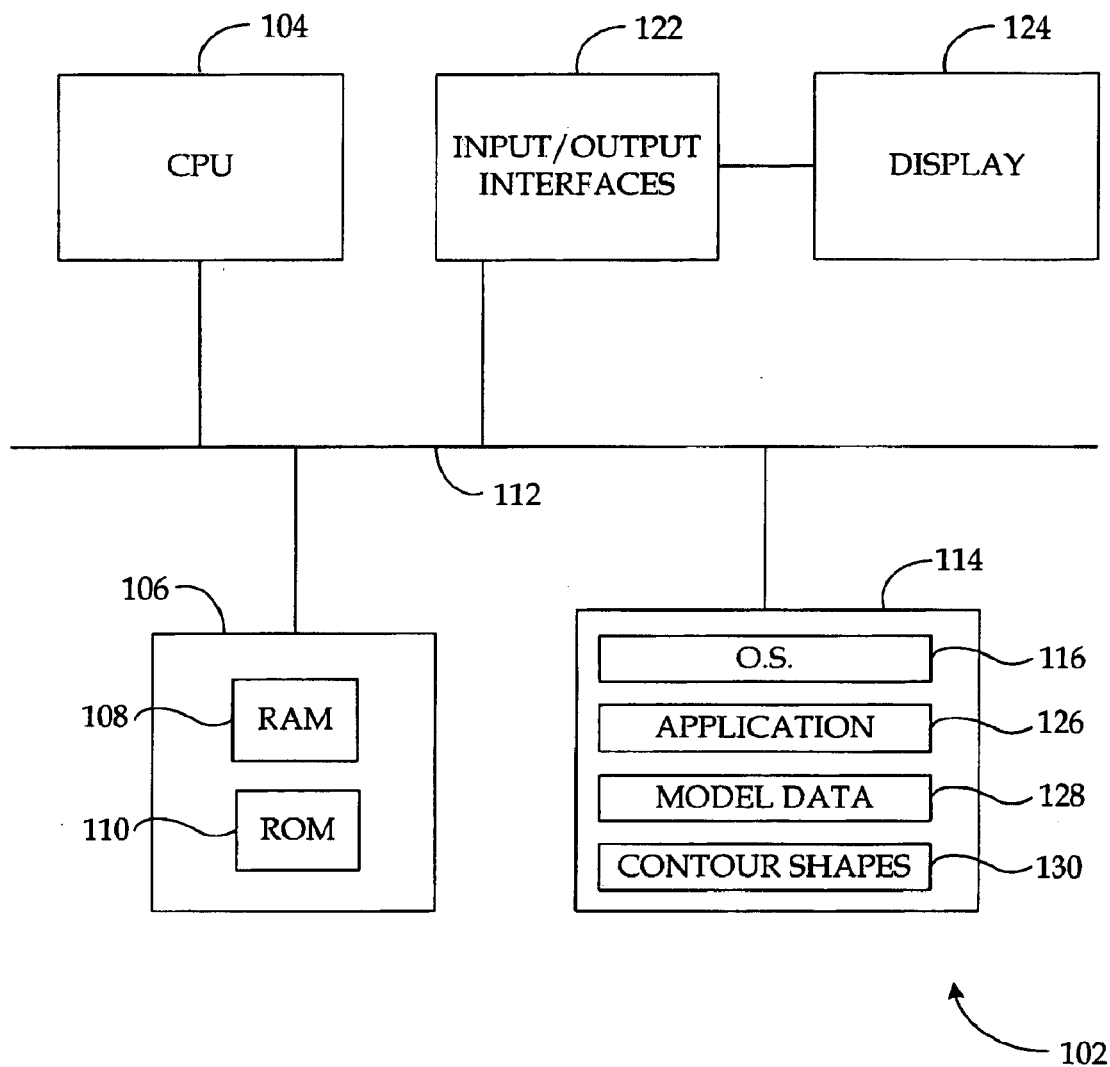
FIG. 1 shows a typical computer system operating environment for embodiments of the present invention.

FIG. 1 and the following discussion are intended to provide a brief, general description of a suitable computer system environment in which the invention may be implemented. While the invention will be described in the general context of program modules that execute in conjunction with application programs that run on an operating system on a personal computer, those skilled in the art will recognize that the invention may also be implemented in combination with other program modules. Generally, program modules include routines, programs, components, data structures, and other types of structures that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention as applied to the personal computer of FIG. 1 may also be practiced in distributed computing environments where tasks are performed by remote processing devices that are linked through a communications network. In a distributed computing environment, program modules may be located in both local and remote memory storage devices.

FIG. 1 shows an illustrative computer architecture for a personal computer 102 for practicing the various embodiments of the invention. The computer architecture shown in FIG. 1 illustrates a conventional personal computer, including a central processing unit 104 ("CPU"), a system memory 106, including a random access memory 108 ("RAM") and a read-only memory ("ROM") 110, and a system bus 112 that couples the memory to the CPU 104. A basic input/output system containing the basic routines that help to transfer information between elements within the computer, such as during startup, is stored in the ROM 110. The personal computer 102 further includes a mass storage device 114 for storing an operating system 116 and application programs, such as the application program 126 that uses the closed contours of the surface model. The mass storage device 114 may also store the surface model data 128 and contour data 130 that result from the logical operations of FIG. 2.

The mass storage device 114 is connected to the CPU 104 through a mass storage controller (not shown) connected to the bus 112. The mass storage device 114 and its associated computer-readable media, provide non-volatile storage for the personal computer 102. Although the description of computer-readable media contained herein refers to a mass storage device, such as a hard disk or CD-ROM drive, it should be appreciated by those skilled in the art that computer-readable media can be any available media that can be accessed by the personal computer 102.

By way of example, and not limitation, computer-readable media may comprise computer storage media and communication media. Computer storage media include volatile and non-volatile, removable and non-removable media implemented in any method or technology for storage of information such as computer-readable instructions, data structures, program modules or other data. Computer storage media include, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium Which can be used to store the desired information and which can be accessed by the computer.

Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media. Computer-readable media may also be referred to as computer program product.

The personal computer 102 of FIG. 1 may also include input/output controller interfaces 122 for receiving and processing input from a number of devices, including a keyboard or mouse (not shown). Similarly, the input/output controller interfaces 122 may provide output to a display screen 124, a printer, or other type of output device. Such output may include a contour map such as that created by the logical operations of FIG. 5 and shown in FIG. 6.

As mentioned briefly above, a number of program modules and data files may be stored in the mass storage device 114 and RAM 108 of the personal computer 102, including an operating system 116 suitable for controlling the operation of a stand-alone personal computer. The mass storage device 114 and RAM 108 may also store one or more application programs such as the application 126 that creates and/or uses the closed contours. Embodiments of the present invention provide program modules for use in conjunction with the application program 126. The program modules may implement logical operations such as those of FIG. 2 to create the closed contours by treating the null values of the surface model data. Furthermore, the program modules may implement logical operations such as those of FIG. 5 to generate contour map displays based on the closed contours.

Figure 2:
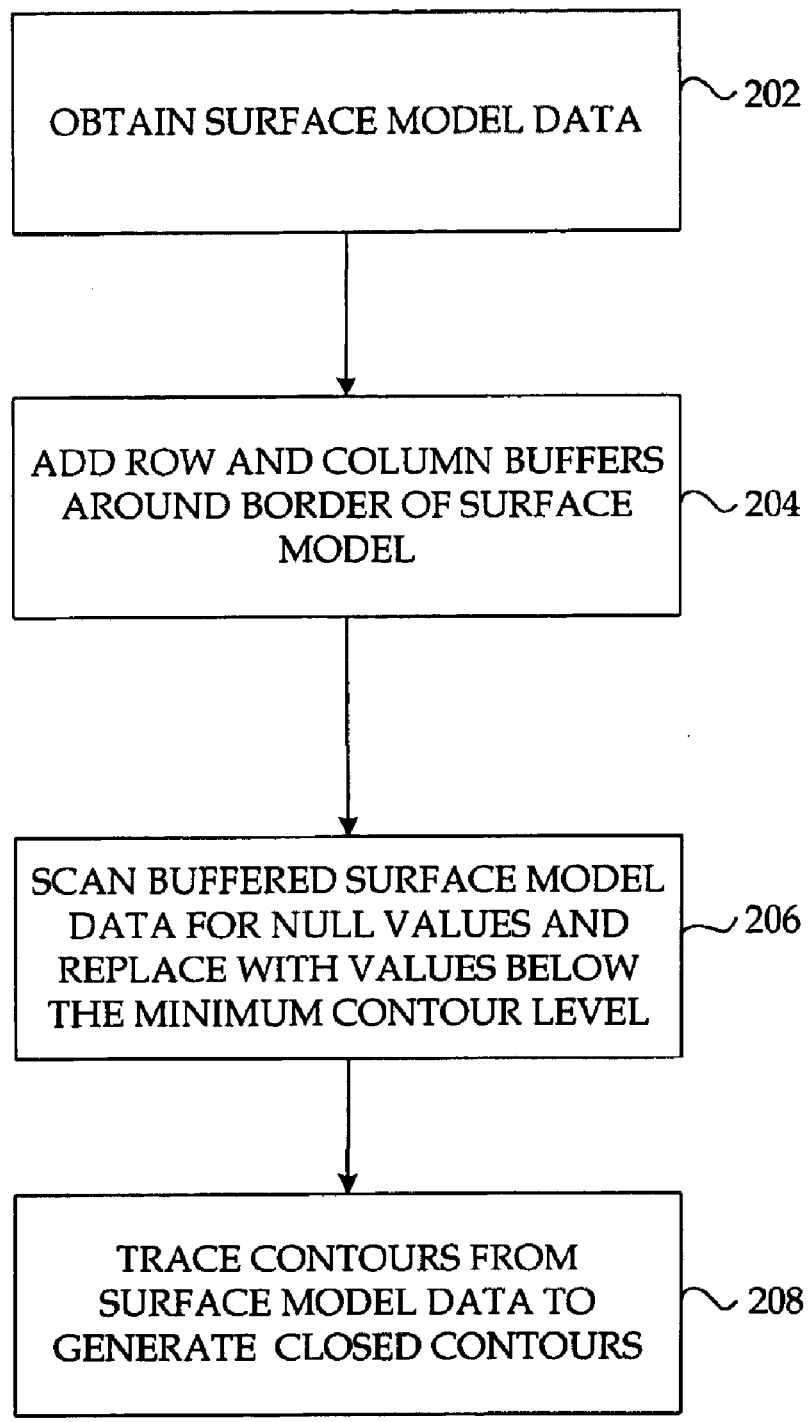
FIG. 2 shows the logical operations performed by an embodiment to close contours of a surface model left open by null values.
Figure 3:
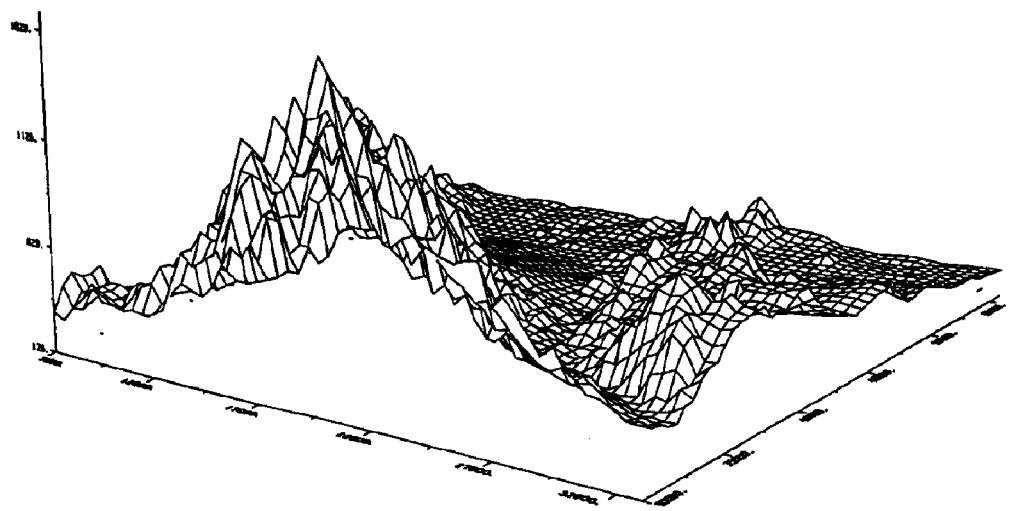
FIG. 3 shows a surface model with null values at the boundaries that result in open contours.

FIG. 2 shows an example of logical operations performed by a processing device, such as the processor 104 of the computer system of FIG. 1 to generate closed contours from surface models that include null values. An example of a surface model that includes null values is shown in FIG. 3.

As can be seen, at the borders of the area being modeled, the surface model data including z-axis values for x, y coordinates stops without the contours necessarily stopping. This is indicated by the solid white section below the surface along the borders of the modeled area. A trace of each contour level to be represented for this surface model data results in the contour level running out of data at the edges, rather than the contours closing back to the starting point, such that the trace produces an open contour. Accordingly, this lack of data of the contour beyond the edge surface is an example of null values for the contour, because the remaining portion of the contour not included in the surface model data is undefined.

The logical operations of FIG. 2 close the contours for the surface model so that the closed contours may aid subsequent computations for the surface model that are discussed below. The logical operations of FIG. 2 begin at data operation 202 where the processor 102 executing the program modules of the application program 126 accesses the surface model data 128 from the storage device 114. The surface model data typically have data that extends to the bounds of the area being modeled and stops, thereby leaving contours open at the boundary as shown in FIG. 3. This boundary condition is addressed at border operation 204 where the processing device 102 expands the grid of data for the area by adding rows and columns to surround the borders of the surface model data. These added rows and columns can be seen in the example model data of FIG. 4 where the borders of the model are outside of the original model data.

Upon creating the buffer around the border of the modeled area, the processing device 102 then scans the buffered surface model data for null values at null operation 206. The null values include the values of the rows and columns added to surround the borders since values of these rows and columns are undefined. Other null values may be present within the interior grid space of the surface model data as well. Upon encountering a null value within the surface model data, a value is also assigned to replace the null value at null operation 206. This value may be a very large positive value that falls multiple orders of magnitude above the maximum elevation level or may be a very large negative value that falls multiple orders of magnitude below the maximum (i.e., most negative) depression level. For subsequent analysis such as volumetrics, it is beneficial to use very large negative values which result in a steep downward cliff along the borders, as shown in FIG. 4.

Once the border areas and any other areas within the grid space have been defined by the values assigned in place of the null values, the contours of the model data can be traced using conventional methods such as cell or curve priority at contour operation 208. The contours that result from this tracing are closed because each horizontal plane cutting through the modeled surface encounters a steep cliff where null values would have otherwise been present. For example, every contour reaching the border of the modeled surface encounters the cliff that borders the modeled area and that closes the contour. As a part of tracing the contours, the local slope at the boundary of the contour may be determined from the surrounding z-axis values and stored for subsequent uses described below. These contour shapes may be stored as contour shape data 130 on the mass storage device 114 for subsequent use and analysis.

As discussed above, FIG. 4 shows a surface model after the logical operations of FIG. 2 have replaced the null values for the z-axis at the border where buffer zones are created by assigning relatively large negative numbers in place of the null values. In the surface models of FIGS. 3 and 4, the convention used is that positive z-axis numbers represent elevations above a reference point while negative z-axis numbers represent depressions below the reference point. Accordingly, the large negative numbers substituted in place of null values creates the steep cliff, identified by the nearly vertical surface lines, in place of the white undefined region at the border as shown in FIG. 3. A trace of the contours of the surface model of FIG. 4 results in a defined edge for each contour encountering the border, and this defined edge closes the contour where the null values had previously left it open.

Figure 4:
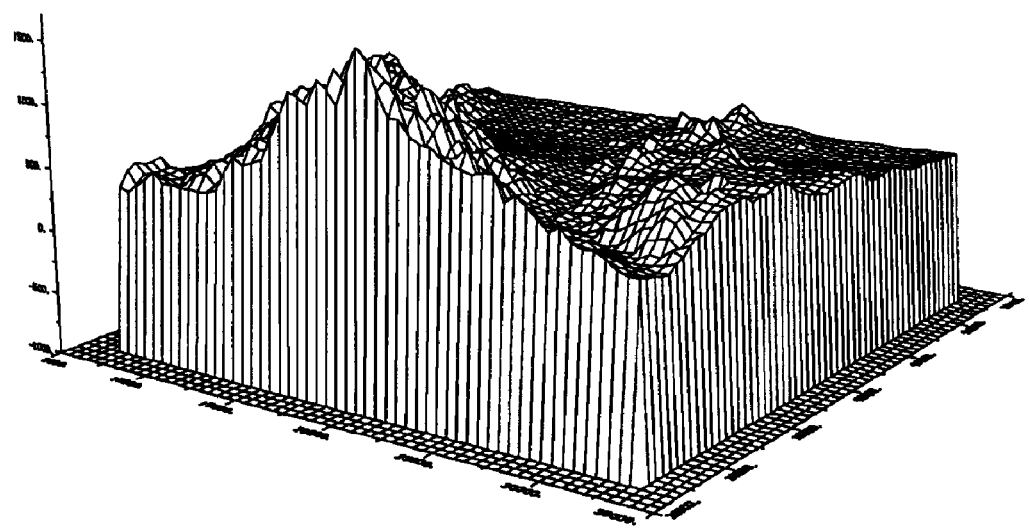
FIG. 4 shows a surface model with values assigned in place of the null values along the border, according to the logical operations of FIG. 2, to create closed contours.

While numbers many orders of magnitude greater than the maximum z-axis value of the dataset may be substituted in place of the null values, FIG. 4 was produced by substitution of values that are large in absolute value relative to the range of minimum to maximum values, although not several orders of magnitude greater than a maximum. These relatively large substitute values were used so that the resulting image would be more understandable when viewed. It will be appreciated that substituting values several orders of magnitude greater in absolute value than a maximum value of the dataset minimizes the degree to which the polygons extend into the null cells so that the extension is negligible. Minimizing the extension into the null cells prevents a stair-step look from resulting in the colorfilled contour map and minimizes the contribution of the extension to the calculation of planimetric volumes that is based on the contour shapes.

Once the contours are closed in this way so that the trace can return to its starting point, the shape data 130 representing the contours can be used in subsequent calculations and analysis. For example, the area can be computed for each shape representing a contour. During the trace, a convention may be used such that the downhill slope is to the right of the trace direction of the surface model. Thus, traces around an elevation are done in a counter-clockwise direction while traces around a depression are done in a clockwise direction. Accordingly, various area formulas such as a simplified form of Green's Theorem in the Plane may be used to compute the area of each shape representing a contour such that the downhill-to-the-right convention results in contour shapes of elevations having a positive area and contour shapes of depressions having a negative area. It will be appreciated that alternative methods of distinguishing elevations and depression may be used as well, such as storing a flag for each contour object representing a depression as opposed to computing a negative area.

Furthermore, volumetrics may be computed from these areas. As an example, a planimetric estimate of the volume under the modeled surface can be made by multiplying the area of each contour shape by the contour interval and then computing the sum of these products. When calculating the area of contour shapes as discussed above, it is beneficial to maintain negative areas for depression contours as such negative values automatically provide the correct sign for volumetric contribution of the depression contours. The area of the shapes can also be used to simplify the display of contours of a substantially opaque color (i.e., one that covers up or at least obscures in some fashion the underlying subject matter) on a contour map.

Figure 5:
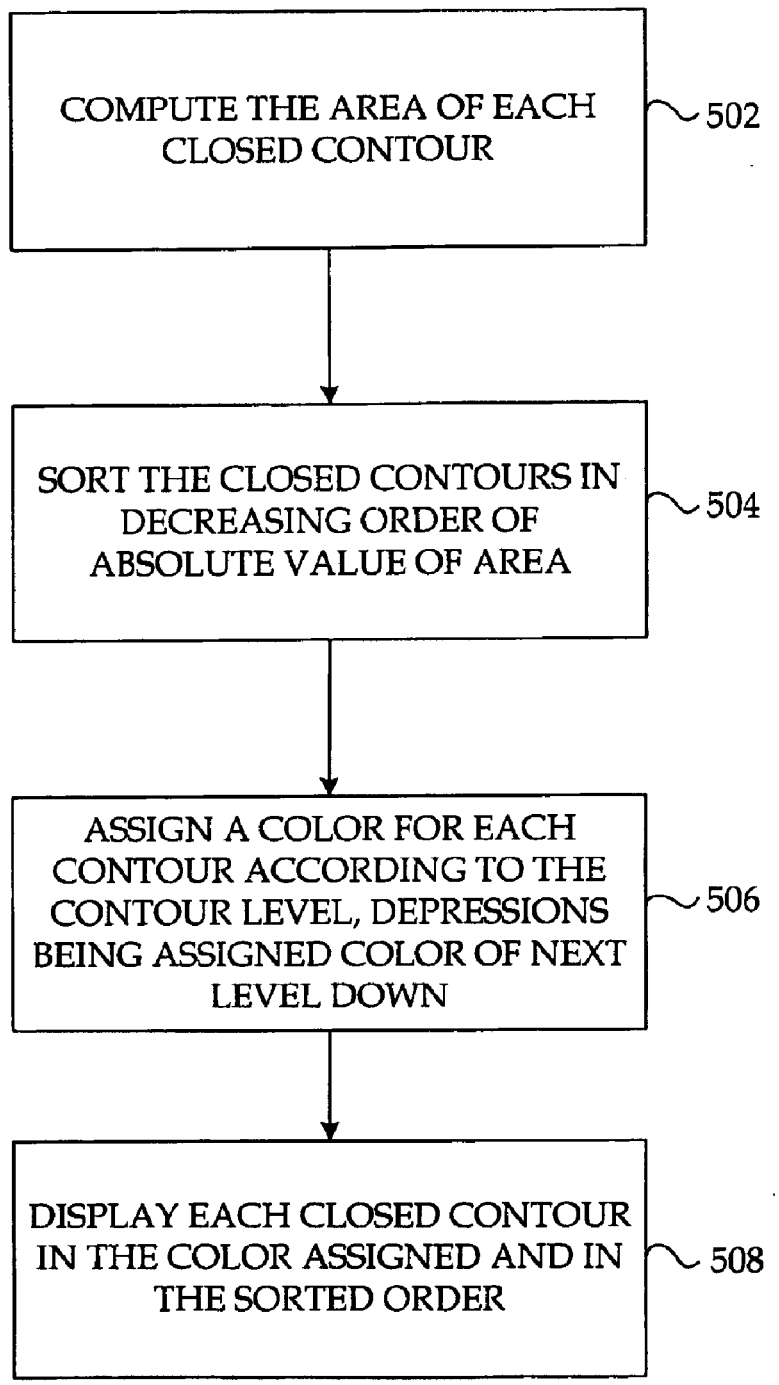
FIG. 5 shows the logical operations performed by an embodiment to generate a display of a contour map from closed contours.

The illustrative logical operations of FIG. 5 for one embodiment use closed contours, such as those provided by the logical operations of FIG. 2, to generate a contour map. In this map, shapes representing contours overlap as necessary, but contours that should appear in the map are not obscured by the overlap. The logical operations of FIG. 5 begin at area operation 502 where the area of each contour shape that has been generated is determined through the use of an area formula, such as the simplified form of Green's Theorem. Upon determining the area of each contour shape, the contour shapes are sorted into an order based on the area determination at sort operation 504. For example, the contour shapes may be sorted in decreasing order of area. Specifically, where depression contours are present for a modeled surface and are identified by a negative area, the sort may be in decreasing order of the absolute value of area.

After the contour shapes are sorted into the proper order according to area, a substantially opaque color may be assigned for each contour shape according to the contour level at color operation 506. There may be separate contour shapes that lie within the same contour level, and these contour shapes may be assigned the same color since they correspond to the same level. A depression contour is assigned the color of the next level down because a depression contour represents a hole where one expects to see a level below the adjacent contour. Once a color index is assigned to a contour shape, the contour shape is ready for display at display operation 508. However, rather than sending the contour shapes to the display in an arbitrary manner, the contours are displayed in the assigned color but in order of decreasing area, which includes the decreasing absolute value of area where contour shapes of negative area are present. Because the contour shapes with the smaller area are displayed after the contour shapes with the larger area, any overlap between the contour shapes does not result in the shape of smaller area being obscured.

Display operation 508 may display the contour shapes with a boundary line to clearly indicate the edge of one contour level relative to another or to display the contours as conventional contour lines. However, to avoid displaying a boundary line where only the artificial boundary exists due to the substitution of values in place of nulls, display operation 508 may verify that the local slope associated with a portion of the boundary is not too great prior to displaying that portion of the boundary. If the local slope is too great, then this is indicative of the cliff that resulted from the substitution of values in place of nulls so that it is known that the boundary is artificial and the boundary line for this portion should not be displayed.

Figure 6:
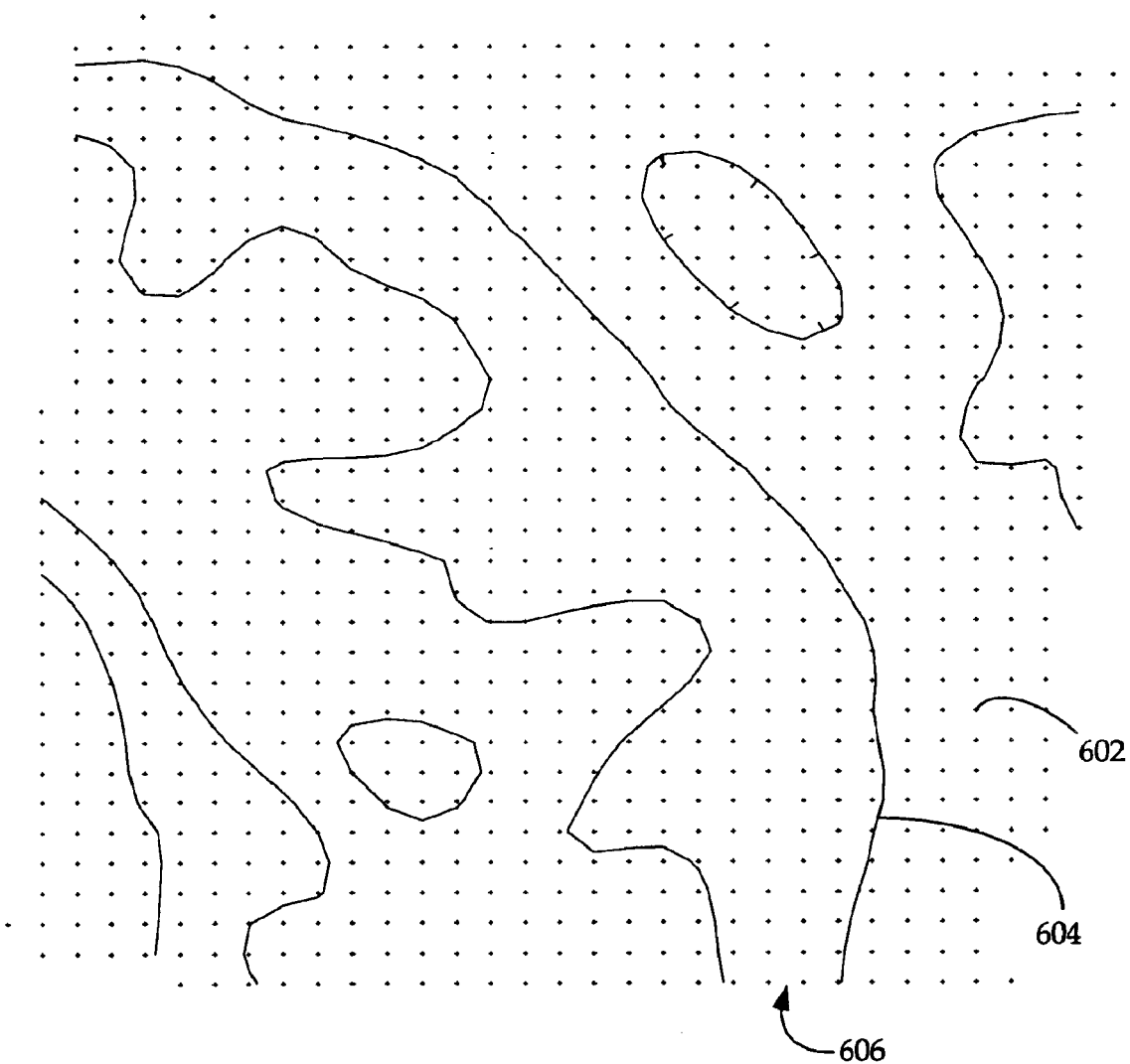
FIG. 6 shows a rendering of contour map data including valid grid nodes where contours are left open by null values at the boundary defined by the set of grid nodes.

FIG. 6 shows a rendering of a contour map dataset where the non-null grid nodes are shown and where contours extend beyond the grid nodes so that they must be closed through the operations of FIG. 2. As shown in FIG. 6, the grid nodes 602 define the dataset for the contour map. As shown the contour maps have an edge 604 and this edge extends beyond the boundary of the grid nodes for several of the contours, such as the extension beyond the boundary area 606. Accordingly, these contours are left open.

Figure 7:
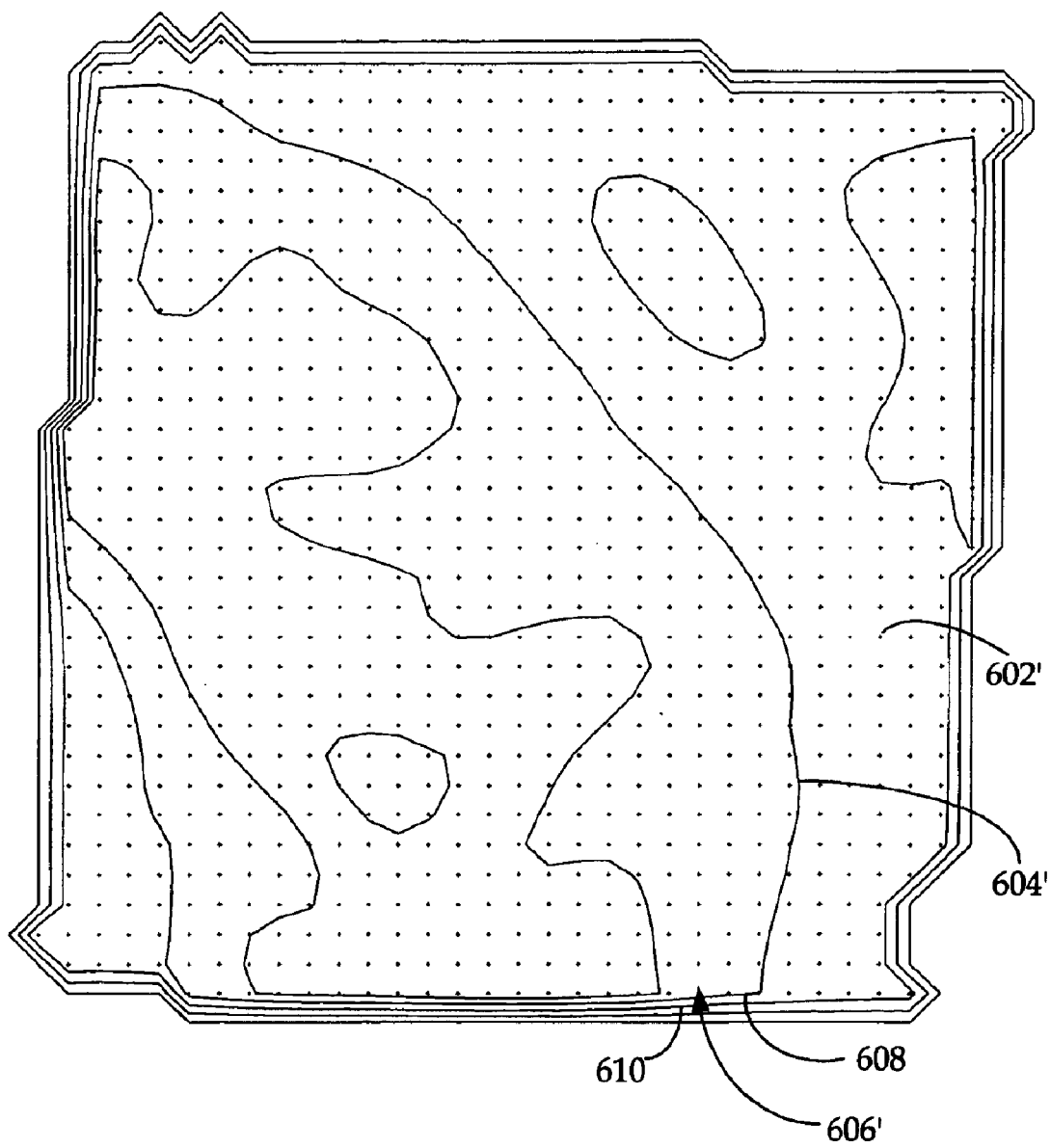
FIG. 7 shows a rendering of contour map data including valid grid nodes where contours formerly left open by null values at the boundary defined by the set of grid nodes are closed by substitution of large values.

FIG. 7 shows the rendering of the contour map dataset where the non-null grid nodes 602' and edges 604' are shown and where the contours are closed by application of the operations of FIG. 2. As can be seen, the boundary area 606' is no longer left open, but instead a series of edges 608 and 610 resulting from the substitution of values for null values beyond the dataset edge are present to close the contours. As discussed above in relation to FIG. 4, the rendering of FIG. 7 is based on values being substituted for nulls where the substituted values are large in absolute value relative to the range of minimum to maximum values of the dataset, although not several orders of magnitude larger so that the rendering would be more understandable when viewed.

Figure 8:
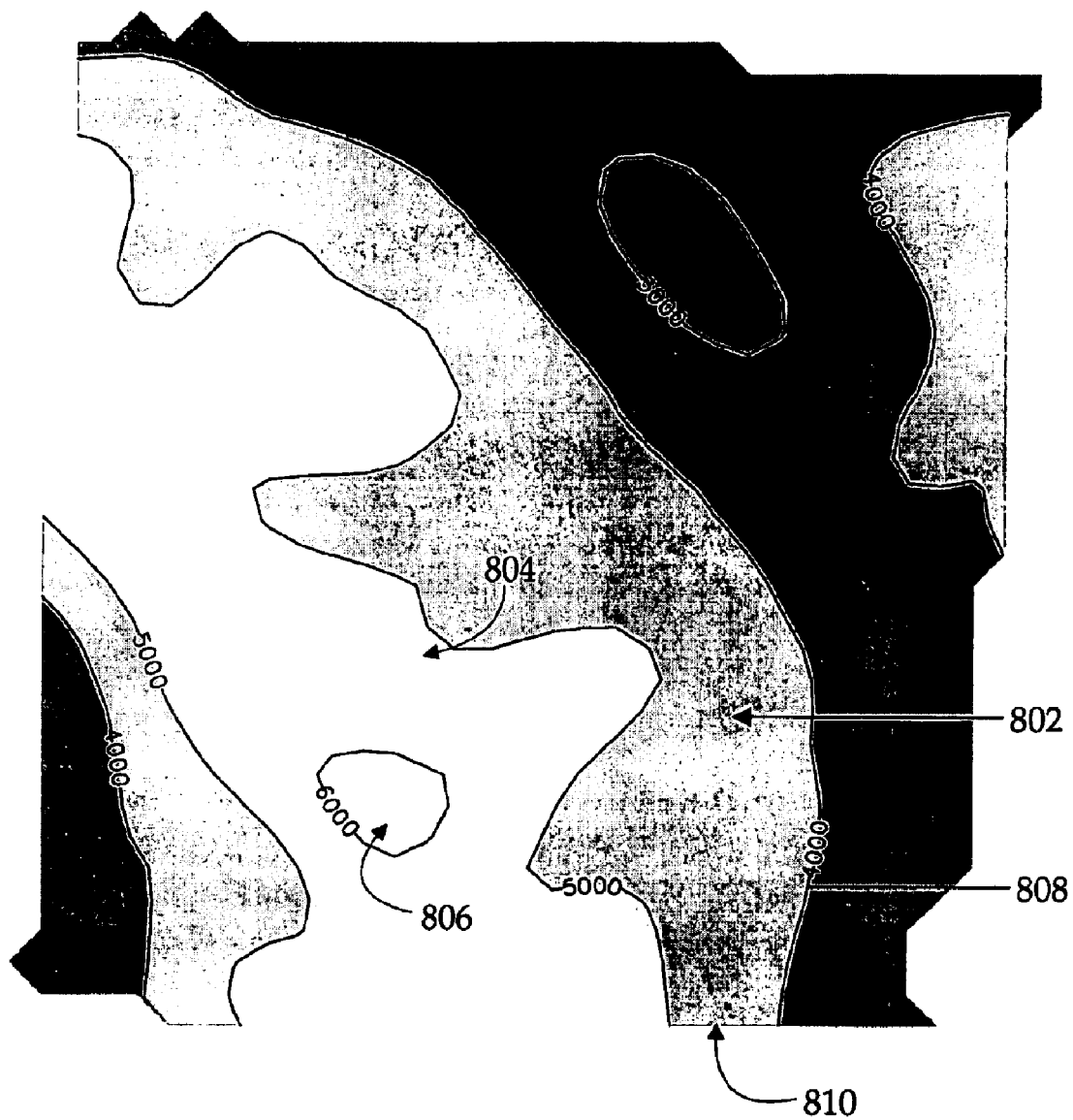
FIG. 8 shows a colorfill contour map display corresponding to that of FIGS. 6 and 7 and displayed according to the logical operations of FIG. 5 such that the overlapping of contours represented as opaque shapes does not render contours obscured.

FIG. 8 shows an example of a colorfilled contour map displayed by the logical operations of FIG. 5. The colorfilled contour map contains several individual shapes representing contour levels of a modeled surface. The colorfilled contour map contains both elevations above a reference point and depressions below the reference point. Each shape is colored in a substantially opaque color which is from a gray scale in this example. It will be appreciated that colors beyond gray scale may be used as well. As shown, the boundary of the contour shapes is defined by a line 808. However, this line may not be present in the actual colorfilled contour map but is shown in FIG. 8 to demonstrate the edges of each contour. It will be appreciated that these boundary lines may also be displayed in the colorfilled contour map if desired. However, these boundary lines appearing at stretches of the boundary of a contour where null values were initially present in the surface model but were replaced, such as at border area 810, may not be displayed. As discussed above with reference to display operation 508, not displaying the boundary line at this area makes it evident that the contour is not defined by the artificial boundary resulting from the replacement of the null values.

The order in which each contour shape is displayed is evident from this example of FIG. 8. A relatively large contour in terms of absolute value of area, contour shape 802, is displayed before relatively smaller contour shapes 804 and 806. Then, the next largest contour by absolute value, contour shape 804, is displayed and then shape 806 is displayed. The contour shape with the relatively smallest absolute value of area, which is contour shape 806 and which typically corresponds to the top contour level of an elevation or a bottom contour level of a depression, is displayed last. In this way, the smaller contour shapes overlap with the larger contour shapes but are displayed atop the larger contour shapes. Because the smaller contours are displayed atop the larger contour shapes, the smaller contours are not obscured by the overlap. Had a contour shape with a relatively large area such as shape 802 been displayed last rather than first, then many of the contour shapes including contour shapes 804 and 806 would have been completely obscured.

As discussed above, closed contours may be used for various purposes to aid in the analysis of a modeled surface. The closed contours may be generated where null values are present by assigning values in place of the null values, as indicated by the illustrative logical operations of FIG. 2. The closed contours may be used to compute volumetrics and other measures as well as generate contour maps where overlapping contours of opaque color do not result in obscured contours, such as by the illustrative logical operations of FIG. 5.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of displaying a contour map for a modeled surface, comprising:

generating shapes that are closed contours for various contour levels to be represented, wherein generating shapes comprises detecting whether a model surface for the contour levels has null values and assigning a value in place of the null value to close the contour levels and wherein assigning a value comprises assigning a value that is negative and that has an absolute value that is multiple orders of magnitude larger than maximum values of the modeled surfaces;

calculating the area of each of the shapes; and displaying the shapes using substantially opaque color for each shape, wherein the shapes are added to the display in order of decreasing area.

2. The method of claim 1, further comprising assigning a unique color for each contour level to fill each shape prior to displaying the shapes.

3. The method of claim 1, wherein calculating the area of each of the shapes comprises giving shapes representing contour levels of an elevation a positive area and giving shapes representing contour levels of a depression a negative area, and wherein displaying the shapes comprises adding the shapes to the display in order of decreasing absolute value of area.

4. A method of using closed contours for a modeled surface, comprising:

detecting null values within the modeled surface that leave contours of the modeled surface open;

assigning a value in place of the null values, wherein an absolute value of the value being assigned is multiple orders of magnitude larger than the absolute value of maximum non-null values of the modeled surface; and using the assigned values to close the contours where the null values result in open contours.

5. The method of claim 4, further comprising computing volumetrics of the modeled surface based on the closed contours.

6. The method of claim 4, further comprising computing the area of the closed contours.

7. The method of claim 6, further comprising:

assigning a substantially opaque color to the closed contours; and displaying the closed contours in decreasing order of an absolute value of the computed area of each closed contour.

8. A method of using closed contours to display a contour map for a modeled surface, comprising:

detecting null values within the modeled surface that leave the contours open;

assigning a value in place of the null values, wherein an absolute value of the value being assigned is multiple orders of magnitude larger than the absolute value of maximum non-null values of the modeled surface;

relying on the assigned values to close the contours where the null values result in open contours, wherein the closed contours are represented as shapes;

calculating the area of each of the shapes; and displaying the shapes using substantially opaque color for each shape, wherein the shapes are added to the display in order of decreasing area.

9. The method of claim 8, further comprising assigning a unique color to fill each shape of a different contour level prior to displaying the shapes.

10. The method of claim 8, wherein calculating the area of each of the shapes comprises giving shapes representing contour levels of an elevation a positive area and giving shapes representing contour levels of a depression a negative area, and wherein displaying the shapes comprises adding the shapes to the display in order of decreasing absolute value of area.

11. The method of claim 8, wherein assigning a value comprises assigning a value that is negative.

12. The method of claim 8, wherein displaying the shapes comprises displaying a boundary line of the shape except at the boundary where the non-null values have been assigned in place of the null values.

13. A computer system for displaying a contour map for a modeled surface, comprising:

a display device; and a processing device configured to generate shapes that are closed contours for various contour levels to be represented, calculate the area of each of the shapes, and initiate the display of the shapes using substantially opaque color for each shape, wherein the shapes are added to the display in order of decreasing area, wherein the processing device generates shapes by detecting whether a modeled surface for the contour levels has null values and assigning a value in place of the null value to close the contour levels, and wherein the processing device assigns a value that is negative and that has an absolute value that is multiple orders of magnitude larger than maximum non-null values of the modeled surface.

14. The computer system of claim 13, wherein the processing device is further configured to assign a unique color to fill each shape of a different contour level prior to initiating the display of the shapes.

15. The computer system of claim 13, wherein the processing device calculates the area of each of the shapes by giving shapes representing contour levels of an elevation a positive area and giving shapes representing contour levels of a depression a negative area, and wherein the processing device initiates the display of the shapes by adding the shapes to the display in order of decreasing absolute value of area.

16. A computer system for using closed contours for a modeled surface, comprising:

storage containing data values for the modeled surface; and a processing device configured to detect null values within the modeled surface that leave contours of the modeled surface open, assign a value in place of the null values, wherein an absolute value of the value being assigned is multiple orders of magnitude larger than the absolute value of maximum non-null values of the modeled surface, and using the assigned values to close the contours where the null values result in open contours.

17. The computer system of claim 16, wherein the processing device is further configured to compute volumetrics of the modeled surface based on the closed contours.

18. The computer system of claim 16, wherein the processing device is further configured to compute the area of the closed contours.

19. The computer system of claim 18, further comprising a display device, and wherein the processing device is further configured to assign a substantially opaque color to the closed contours and initiate display of the closed contours in decreasing order of an absolute value of the computed area of each closed contour.

20. A computer system for using closed contours to display a contour map for a modeled surface, comprising:

storage containing values of a modeled surface; and a processing device configured to detect null values within the modeled surface that leave the contours open, assign a value in place of the null values, wherein an absolute value of the value being assigned is multiple orders of magnitude larger than the absolute value of maximum non-null values of the modeled surface, use the assigned values to close the contours where the null values result in open contours and wherein the closed contours are represented as shapes, calculate the area of each of the shapes, and initiate display of the shapes using substantially opaque color for each shape, wherein the shapes are added to the display in order of decreasing area.

21. The computer system of claim 20, wherein the processing device is further configured to assign a unique color to fill each shape of a different contour level prior to initiating display of the shapes.

22. The computer system of claim 20, wherein the processing device calculates the area of each of the shapes by giving shapes representing contour levels of an elevation a positive area and giving shapes representing contour levels of a depression a negative area, and wherein the processing device initiates display of the shapes by adding the shapes to the display in order of decreasing absolute value of area.

23. The computer system of claim 20, wherein the processing device assigns a value that is negative.

24. A computer readable medium containing instructions that when executed by a computer performs steps to use closed contours to display a contour map for a modeled surface, the steps comprising:

detecting null values within the modeled surface that leave the contours open;

assigning a value in place of the null values, wherein an absolute value of the value being assigned is multiple orders of magnitude larger than the absolute value of maximum non-null values of the modeled surface;

using the assigned values to close the contours where the null values result in open contours, wherein the closed contours are represented as shapes;

calculating the area of each of the shapes; and displaying the shapes using substantially opaque color for each shape, wherein the shapes are added to the display in order of decreasing area.

25. The computer readable medium of claim 24, wherein assigning a value comprises assigning a negative value, and wherein negative area of a shape indicates a depression of the modeled surface and a positive area of a shape indicates an elevation of the modeled surface.

* * * * *